(12) United States Patent
Jeong

(10) Patent No.: US 11,601,725 B2
(45) Date of Patent: Mar. 7, 2023

(54) SERVER, TERMINAL APPARATUS, DISPLAY DEVICE, AND CONTROL METHOD THEREOF

(71) Applicant: SAMSUNG ELECTRONICS CO., LTD., Suwon-si (KR)

(72) Inventor: Goh Woon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 208 days.

(21) Appl. No.: 16/755,756

(22) PCT Filed: Oct. 25, 2018

(86) PCT No.: PCT/KR2018/012703
§ 371 (c)(1),
(2) Date: Apr. 13, 2020

(87) PCT Pub. No.: WO2019/093696
PCT Pub. Date: May 16, 2019

(65) Prior Publication Data
US 2020/0260151 A1    Aug. 13, 2020

(30) Foreign Application Priority Data

Nov. 10, 2017   (KR) ........................ 10-2017-0149345

(51) Int. Cl.
*H04N 21/2343*   (2011.01)
*H04N 21/262*    (2011.01)
(Continued)

(52) U.S. Cl.
CPC ..... *H04N 21/485* (2013.01); *H04N 21/25891* (2013.01); *H04N 21/2668* (2013.01);
(Continued)

(58) Field of Classification Search
None
See application file for complete search history.

(56) References Cited

U.S. PATENT DOCUMENTS

2012/0120316 A1    5/2012  Lee
2013/0311561 A1    11/2013 Ku et al.
(Continued)

FOREIGN PATENT DOCUMENTS

KR    10-2012-0051966    5/2012
KR    10-2014-0023852    2/2014
(Continued)

OTHER PUBLICATIONS

Office Action dated Dec. 28, 2021 in Korean Patent Application No. 10-2017-0149345 and summarized English-language translation.
(Continued)

*Primary Examiner* — Brian T Pendleton
*Assistant Examiner* — Jean D Saint Cyr
(74) *Attorney, Agent, or Firm* — Nixon & Vanderhye, P.C.

(57) ABSTRACT

The disclosure relates to a server, a terminal apparatus, a display apparatus and control methods thereof, the server including: a communicator configured to communicate with an outside; a storage; and a processor configured to, based on a user input for setting a user screen corresponding to a predetermined user being received in a terminal apparatus connected through the communicator, identify a configuration of an edit screen for setting the user screen based on user information stored in the storage, control the communicator to transmit information about the edit screen based on the identified configuration to the terminal apparatus, receive user input information about the edit screen displayed on the terminal apparatus through the communicator, set the user screen by storing the received user input information in the
(Continued)

storage, and control the communicator to provide the set user screen to the display apparatus. Thus, there is provided a user screen configured with information needed for a user.

6 Claims, 10 Drawing Sheets

(51) Int. Cl.
*H04N 21/431* (2011.01)
*H04N 21/458* (2011.01)
*H04N 21/485* (2011.01)
*H04N 21/25* (2011.01)
*H04N 21/418* (2011.01)
*H04N 21/475* (2011.01)
*H04N 21/4788* (2011.01)
*H04N 21/258* (2011.01)
*H04N 21/2668* (2011.01)
*H04N 21/482* (2011.01)

(52) U.S. Cl.
CPC ....... *H04N 21/431* (2013.01); *H04N 21/4788* (2013.01); *H04N 21/4821* (2013.01)

(56) References Cited

U.S. PATENT DOCUMENTS

| | | | |
|---|---|---|---|
| 2014/0310742 A1* | 10/2014 | Kim | H04N 21/485 725/110 |
| 2016/0070449 A1 | 3/2016 | Christiansen et al. | |
| 2017/0208357 A1* | 7/2017 | Greene | H04N 21/47214 |

FOREIGN PATENT DOCUMENTS

| | | |
|---|---|---|
| KR | 10-2014-0098515 | 8/2014 |
| KR | 10-1475449 | 12/2014 |
| KR | 10-1526491 | 6/2015 |
| KR | 10-2016-0073219 | 6/2016 |
| KR | 10-1674685 | 11/2016 |
| KR | 10-2017-0045829 | 4/2017 |

OTHER PUBLICATIONS

International Search Report for PCT/KR2018/012703, dated Mar. 28, 2019, 5 pages.
Written Opinion of the ISA for PCT/KR2018/012703, dated Mar. 28, 2019, 7 pages.

* cited by examiner

SERVER, TERMINAL APPARATUS, DISPLAY DEVICE, AND CONTROL METHOD THEREOF This application is the U.S. national phase of International Application No. PCT/KR2018/012703 filed 25 Oct. 2018, which designated the U.S. and claims priority to KR Application No. 10-2017-0149345 filed 10 Nov. 2017, the entire contents of each of which are hereby incorporated by reference.

FIELD

The disclosure relates to a server, a terminal apparatus, a display apparatus and control methods thereof, and more particularly to a server, a terminal apparatus, a display apparatus and control methods thereof, in which a user screen is settable.

DESCRIPTION OF RELATED ART

A television (TV) or the like display apparatus displays an image based on an image signal such as a broadcast signal received from the outside.

The display apparatus may be achieved by a smart TV. The smart TV can receive and display a broadcast signal in real time, support a web-browsing function, and have applications installed for providing various kinds of services, for example, a social network service (SNS), finance, news, weather, a map, music, a movie, a game, an electronic book, etc. to a user.

The smart TV displays a home screen, which has been generated in itself or received from a set-top box (STB), as a startup screen. In general, such a startup screen is unilaterally provided by the manufacturer of the smart TV or STB, or a broadcaster, or the like.

Therefore, a user of the smart TV is restricted to have a quick access to desired information or service through the startup screen.

Further, the smart TV is often shared among family members, i.e. a plurality of users. In this case, it is difficult to provide a customized home screen personalized for a specific user.

SUMMARY

The disclosure is conceived to solve the above-described problems, and the disclosure provides a server, a terminal apparatus, a display apparatus and a control method thereof, in which a home screen is easily configured reflecting a user's preferences and tastes.

Further, the disclosure provides a server, a terminal apparatus, a display apparatus and a control method thereof, which can provide a customized user screen personalized according to a plurality of users who share the display apparatus.

According to an embodiment of the disclosure, a server includes: a communicator configured to communicate with an outside; a storage; and a processor configured to: based on a user input for setting a user screen corresponding to a predetermined user being received in a terminal apparatus connected through the communicator, control the communicator to transmit information about an edit screen for setting the user screen which is configured based on user information stored in the storage to a terminal apparatus connected through the communicator, receive user input information about the edit screen displayed on the terminal apparatus through the communicator, set the user screen by storing the received user input information in the storage, and control the communicator to provide the set user screen to the display apparatus. Thus, a user can directly configure the user screen and receive the personalized user screen through the display apparatus.

The user information may include at least one of user identification information, location information, service information used by a user or preferred content information, and may be received from the display apparatus or an image processing apparatus connecting with the display apparatus. Thus, a user can have customized experience through the user screen with necessary information.

The edit screen may include a first region and a second region, and the second region may display an optional item generated based on the user information, and the first region may display at least one container in which content corresponding to the optional item selected in the second region can be positioned. Thus, it is possible to edit a screen with a simple user input, thereby improving convenience for a user.

The second region may display a service list generated based on the user information, and a template list provided from at least one of a broadcaster or a manufacturer of the display apparatus or an image processing apparatus connecting with the display apparatus, and the optional item of the service list may include an item for at least one of a channel guide, a social network service (SNS) or a service to which a user subscribes. Thus, user interests or preferred content is easily included in the user screen without any separate input.

The processor may control the communicator to transmit the set user screen data to the display apparatus or an image processing apparatus connecting with the display apparatus, based on at least one of a power-on command, home-button control during an operating state, or a user's trigger voice utterance occurred in the display apparatus or the image processing apparatus. Thus, a user can immediately receive required content by making a user input once as necessary.

The processor may process the set user screen to correspond to a size and resolution that a display of the display apparatus has, and control the communicator to transmit the processed user screen data to the display apparatus or the image processing apparatus connecting with the display apparatus. Thus, a user screen having a certain quality level or higher is provided regardless of the specifications of the display apparatus or the image processing apparatus.

Meanwhile, according to an embodiment of the disclosure, a terminal apparatus includes: a user input portion; a display; a communicator configured to communicate with an outside; and a processor configured to receive edit screen information related to user information about a predetermined user and used for setting a user screen from a server through the communicator, control the display to display an edit screen based on the received edit screen information, and control the communicator to transmit user input information received through the user input portion with regard to the edit screen to the server, wherein the user information includes at least one of user identification information, location information, service information used by a user, or preferred content information, and the user screen set based on the user input information is provided from the server to the display apparatus. Thus, a user can directly configure the user screen and receive the personalized user screen through the display apparatus.

The edit screen may include a first region and a second region, the second region may display an optional item generated based on the user information, and the first region may display at least one container in which content corresponding to the optional item selected in the second region can be positioned, and the container may be subjected to at least one of position change in the first region, size adjustment, addition or deletion. Thus, it is possible to edit a screen with a simple user input, thereby improving convenience for a user.

The second region may display a service list generated based on the user information, and a template list provided from at least one of a broadcaster or a manufacturer of the display apparatus or an image processing apparatus connecting with the display apparatus, and the optional item of the service list may include an item for at least one of a channel guide, an SNS or a service to which a user subscribes. Thus, user interests or preferred content is easily included in the user screen without any separate input.

Meanwhile, according to an embodiment of the disclosure, a display apparatus includes: a display; a communicator configured to communicate with an outside; and a processor configured to control the communicator to transmit user information of the display apparatus to a server, identify a user of the display apparatus based on a predetermined event, receive data about user screen corresponding to the identified user from the server through the communicator, and control the display to display the received user screen, wherein the user screen is generated based on the transmitted user information. Thus, a user can directly configure the user screen and receive the personalized user screen from the display apparatus.

The event may include at least one of a power-on command, home-button control during an operating state, or a user's trigger voice utterance occurred in the display apparatus. Thus, a user can immediately receive required content by making only a simple user input as necessary.

Meanwhile, according to an embodiment of the disclosure, a method of controlling a server communicating with a display apparatus and a terminal apparatus includes: based on a user input for setting a user screen corresponding to a predetermined user being received in a terminal apparatus connected through the communicator, transmitting information about an edit screen for setting the user screen which is configured based on user information stored in the server to the terminal apparatus connected through the communicator, receiving user input information about the edit screen displayed on the terminal apparatus from the terminal apparatus, and providing a user screen, which is set by storing the received user input information in the server, to the display apparatus. Thus, a user can directly configure the user screen and receive the personalized user screen through the display apparatus.

The user information may include at least one of user identification information, location information, service information used by a user or preferred content information, and may be received from the display apparatus or an image processing apparatus connecting with the display apparatus. Thus, user interests or preferred content is easily included in the user screen without any separate input.

The edit screen may include a first region and a second region, the second region may display an optional item generated based on the user information, and the first region may display at least one container in which content corresponding to the optional item selected in the second region can be positioned, and the container may be subjected to at least one of position change in the first region, size adjustment, addition or deletion. Thus, it is possible to edit a screen with a simple user input, thereby improving convenience for a user.

The second region may display a service list generated based on the user information, and a template list provided from at least one of a broadcaster or a manufacturer of the display apparatus or an image processing apparatus connecting with the display apparatus, and the optional item of the service list may include an item for at least one of a channel guide, an SNS or a service to which a user subscribes. Thus, user interests or preferred content is easily included in the user screen without any separate input.

The method may further include transmitting the set user screen data to the display apparatus or an image processing apparatus connecting with the display apparatus, based on at least one of a power-on command, home-button control during an operating state, or a user's trigger voice utterance occurred in the display apparatus or the image processing apparatus. Thus, a user can immediately receive required content by making only a simple user input as necessary.

The method may further include processing the set user screen to correspond to a size and resolution a display of the display apparatus has, and transmitting the processed user screen data to the display apparatus or the image processing apparatus connecting with the display apparatus. Thus, a user screen having a certain quality level or higher is provided regardless of the specifications of the display apparatus or the image processing apparatus.

Meanwhile, according to an embodiment of the disclosure, a method of controlling a terminal apparatus communicating with a server includes: receiving edit screen information related to user information about a predetermined user and used for setting a user screen from the server; displaying an edit screen based on the received edit screen information; and transmitting user input information received with regard to the displayed edit screen to the server, wherein the user information includes at least one of user identification information, location information, service information used by a user, or preferred content information, and the user screen set based on the user input information is provided from the server to a display apparatus communicating with the server. Thus, a user can directly configure the user screen and receive the personalized user screen from the display apparatus. Thus, a user can receive the personalized user screen with necessary information through the display apparatus.

Meanwhile, according to an embodiment of the disclosure, a method of controlling a display apparatus communicating with a server includes: transmitting user information of the display apparatus to a server; identifying a user of the display apparatus based on a predetermined event, and receiving data about user screen corresponding to the identified user from the server; and displaying a user screen based on the received data, wherein the user screen is generated based on the user information transmitted to the server, and the event includes at least one of a power-on command, home-button control during an operating state, or a user's trigger voice utterance occurred in the display apparatus. Thus, it is convenient for a user to receive the personalized user screen with necessary information through the display apparatus.

In a server, a terminal apparatus, a display apparatus, and control methods thereof according to an embodiment of the disclosure, a user can directly edit a user screen to be displayed as a startup screen of the display apparatus, thereby providing the user screen focused on information desired by the user.

Further, a user screen personalized for a specific user who is in a log-on state is provided, so that the user can have customized experience even in an apparatus shared by a plurality of users.

Further, it is easy and convenient for a user to have the user's own user screen without any technical difficulty.

Further, user information and user screen information are stored and managed in the server, and therefore not only the personalized user screen can be easily used in all user apparatuses regardless of the OS of the display apparatus or the terminal apparatus, but also there are no needs of separately storing or installing data in the apparatuses, thereby improving convenience for a user.

REFERENCE NUMERALS

Figure 1:
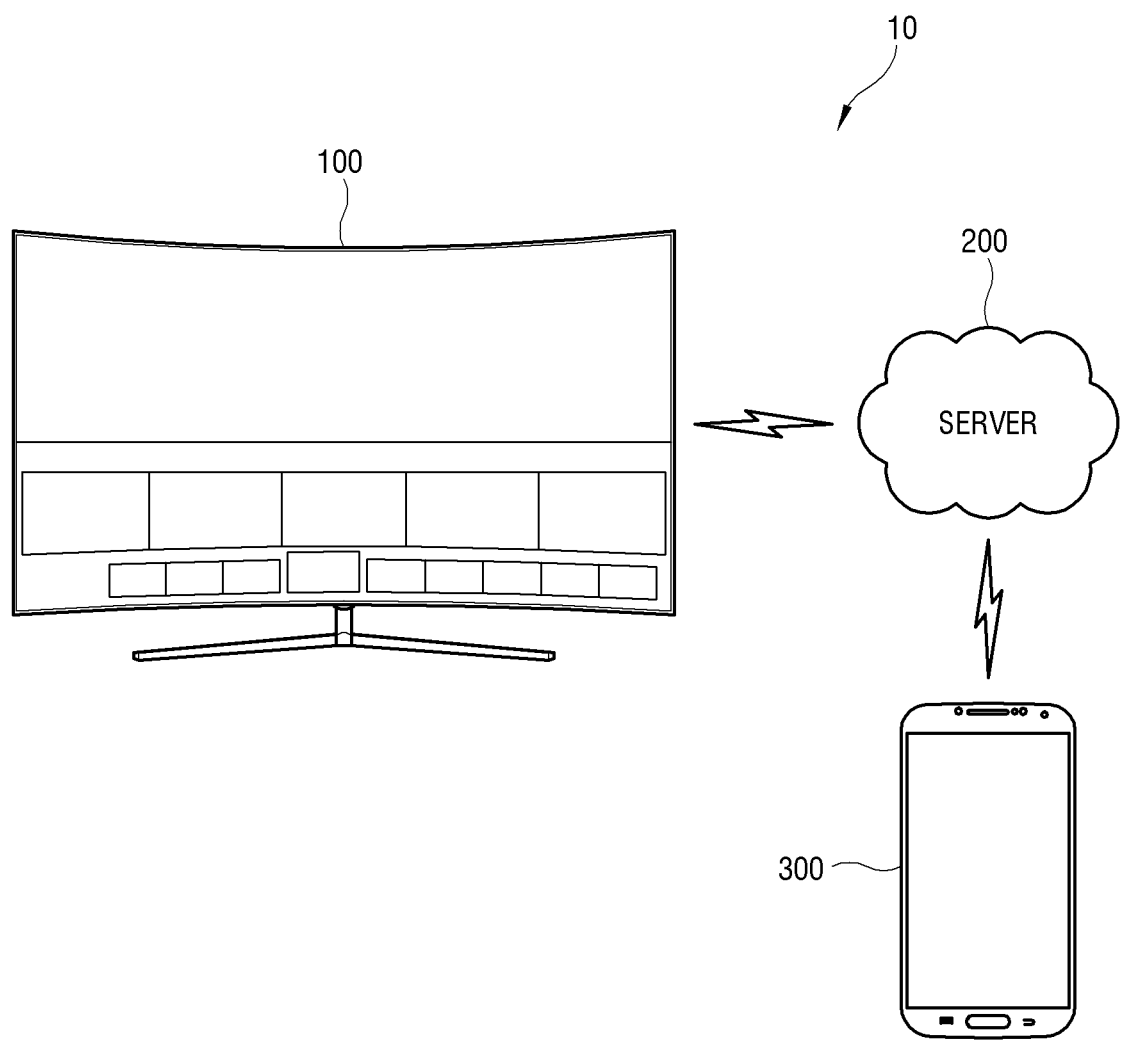
FIG. 1 illustrates a display system according to an embodiment of the disclosure.

100, 101: display apparatus 110: image receiver
120: first image processor 130: first display
140: first user input portion 150: first communicator
160: first storage 170: first controller
102: image processing apparatus 200: server
250: second communicator 260: second storage
270: second controller 300: terminal apparatus
320: second image processor 330: second display
340: second user input portion 350: third communicator
360: third storage 370: third controller

DETAILED DESCRIPTION OF EXAMPLE EMBODIMENTS

Below, exemplary embodiments will be described in detail with reference to accompanying drawings. Further, the descriptions of the embodiments will be made with matters illustrated in the accompanying drawings, in which like numerals or symbols refer to like elements having substantially the same function. In addition, at least one among a plurality of elements in the present disclosure represents not only all the elements but also each one of the elements, which precludes the other elements, or all combinations of the elements.

FIG. 1 illustrates a display system according to an embodiment of the disclosure.

As shown in FIG. 1, a display system 10 according to an embodiment of the disclosure includes a display apparatus 100, a server 200, and a terminal apparatus 300.

The display apparatus 100 processes an image signal, which is received from an external image source (not shown), with a preset image processing process, and displays an image.

According to one embodiment, as shown in FIG. 1, the display apparatus 100 may be embodied by a television (TV) that processes a broadcast image based on a broadcast signal/broadcast information/broadcast data received from a transmitter of a broadcasting station. The broadcast signal received in the display apparatus 100 may be received through a terrestrial wave, a cable, a satellite, etc., and an image source in this embodiment is not limited to the broadcasting station. That is, any apparatus or station capable of transmitting and receiving information may be included in the image source according to the exemplary embodiment.

Further, the display apparatus 100 may receive an image signal from various types of external apparatus. Further, the display apparatus 100 may process a signal to be displayed on a screen as a moving image, a still image, an application, an on-screen display (OSD), a user interface (UI, hereinafter also referred to as a graphic user interface (GUI)) allowing a user to make selection, etc. based on a signal/data stored in an internal/external storage medium or received by streaming.

According to one embodiment, the display apparatus 100 may be materialized by a smart TV or an Internet protocol (IP) TV. The smart TV refers to a TV that can receive and display a broadcast signal in real time, support a web browsing function so that various pieces of content can be searched and consumed through the Internet while a broadcast signal is displayed in real time, and provide a convenient user environment for the web browsing function. Further, the smart TV includes an open software platform to provide an interactive service to a user. Therefore, the smart TV is capable of providing various pieces of content, for example, an application for a predetermined service to a user through the open software platform. Such an application refers to an application program for providing various kinds of services, for example, a social network service (SNS), finance, news, weather, a map, music, a movie, a game, an electronic book, etc.

However, the concept of the disclosure is not limited to the foregoing embodiments of the display apparatus 100, and thus the display apparatus 100 may be applied to various kinds of examples capable of processing an image, such as a monitor connected to a computer, etc. as well as the TV.

According to this embodiment, the display apparatus 100 displays a user screen personalized for a predetermined user as a home screen, i.e. a boot-up screen (hereinafter, also referred to as a startup screen). Here, the startup screen may be provided from the server 200, as a screen displayed at the moment when the display apparatus 100 is powered on.

The server 200 receives and manages user information of the display apparatus 100. According to an embodiment, the user information refers to information about a user account, which may be received from a plurality of apparatuses accessible by one user account, such as the display apparatus 100 and the terminal apparatus 300, and may be collectively managed by the server.

According to an embodiment of the disclosure, the server 200 includes a cloud providing a storage service (hereinafter, referred to as a cloud storage or a cloud server). Such a cloud is accessible by the user account from various apparatuses such as the display apparatus 100 and the terminal apparatus 300, so that data in the cloud can be accessed, changed (i.e. updated) and downloaded regardless of operating systems (OS) of the accessing apparatuses.

The display apparatus 100 may be used as a shared apparatus, and thus shared by a plurality of users such as family members. According to an embodiment, the server 200 may be configured to receive and manage the user information according to the plurality of users with respect to the display apparatus 100.

The server 200 is storing information about the user screen provided as the startup screen of the display apparatus 100. According to an embodiment, the server 200 may store information about the startup screen set for the user corresponding to the user information of the display apparatus 100. When the display apparatus 100 is shared by the plurality of users, the server 200 may store information about the startup screens, i.e. the user screens personalized for the users.

According to an embodiment of the disclosure, a user may access the server 200 through the terminal apparatus 300, and configure, i.e. edit the startup screen of the display apparatus 100.

According to an embodiment, the terminal apparatus 300 may be embodied by a mobile apparatus such as a cellular phone, a smartphone, a tablet and the like smart pad, etc. According to another embodiment, the terminal apparatus 300 may be embodied by a personal computer (PC) such as a laptop or desktop computer. In other words, the terminal apparatus 300 in the display system 10 according to the disclosure may include various apparatuses including a display and allows a user to make an input.

The terminal apparatus 300 receives information for configuring the startup screen of the display apparatus 100 from the server 200, and displays an editor for the startup screen generated based on the received information. According to an embodiment, the information for configuring the startup screen is related to the user information stored and managed in the server 200.

A user may use the editor displayed on the terminal apparatus 300 to make a user input for configuring the startup screen of the display apparatus 100, and the terminal apparatus 300 transmits such received user input information to the server 200.

Figure 2:
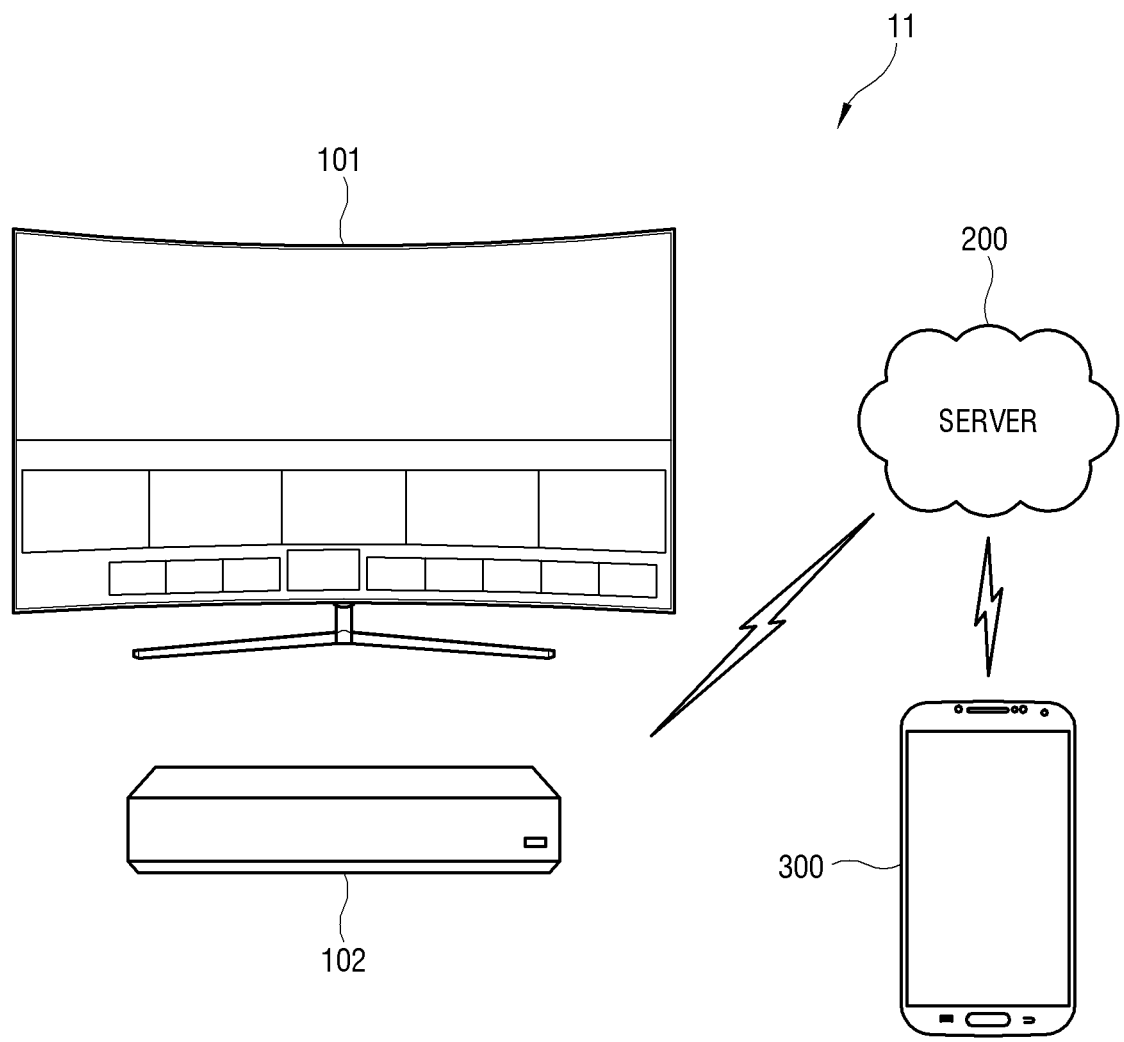
FIG. 2 illustrates a display system according to another embodiment of the disclosure.

FIG. 2 illustrates a display system according to another embodiment of the disclosure.

As shown in FIG. 2, a display system 11 according to this embodiment of the disclosure further includes an image processing apparatus 102 in addition to a display apparatus 101, the server 200, and the terminal apparatus 300, so that the display apparatus 101 can receive various signals/data through the image processing apparatus 102.

Therefore, the elements of the display system 11 according to this embodiment of the disclosure, which perform the same operations as those of the display system 10 according to the previous embodiment of the disclosure, will be given the same terms as those of the display system 10, and repetitive descriptions thereof will be omitted.

The image processing apparatus 102 shown in FIG. 2 is connected to the display apparatus 101 by a wire, and transmits a signal corresponding to an image to be displayed on the display apparatus 101.

Specifically, the image processing apparatus 102 processes an image signal provided from an external image source based on a preset image processing process, and outputs the processed image signal to the display apparatus 101. The processed image signal is displayed as a corresponding image on the display apparatus 101.

According to this embodiment, the image processing apparatus 102 may be embodied by a set-top box (STB) that processes a broadcast image based on a broadcast signal/broadcast information/broadcast data received from a transmitter of a broadcasting station. The broadcast signal may be received in the image processing apparatus 102 through a terrestrial wave, a cable, a satellite, etc. and an image source according to the disclosure is not limited to the broadcasting station. In other words, the image source according to the disclosure may include any apparatus or station capable of transmitting and receiving information.

The image processing apparatus 102 may perform signal processing to display a moving image, a still image, an application, an OSD, a UI allowing a user to make selection, etc. on the screen of the display apparatus 101 based on a signal/data stored in an internal/external storage medium or received by streaming. Further, the image processing apparatus 102 may provide an application for providing a predetermined service such as an SNS, finance, news, weather, a map, music, a movie, a game, an electronic book, etc. to a user through the display apparatus 101.

In the embodiment of FIG. 2, the display apparatus 101 and the image processing apparatus 102 may be connected to each other through a high definition multimedia interface (HDMI) or the like communication-standard interface.

According to this embodiment, the display apparatus 101 displays a screen personalized for a predetermined user as the startup screen. Here, the startup screen refers to a screen displayed at the moment when the display apparatus 101 is turned on, and may be displayed on the display apparatus 101 as provided from the server 200 to the image processing apparatus 102.

The server 200 receives and manages user information from the display apparatus 101. The user information refers to information about a user account, which may be received from a plurality of apparatuses accessible by one user account, such as the display apparatus 101 and the terminal apparatus 300, and may be collectively managed by the server.

The image processing apparatus 102 may be used as a shared apparatus, and thus shared by a plurality of users such as family members. According to an embodiment, the server 200 may be configured to receive and manage the user information according to the plurality of users with respect to the display apparatus 101.

The server 200 is storing information about the startup screen displayed on the display apparatus 101 connected to the image processing apparatus 102. The server 200 may store information about the startup screen set for users corresponding to the user of the image processing apparatus 102. When the image processing apparatus 102 is shared by the plurality of users, the server 200 may store information about the startup screens, i.e. the user screens personalized for the users.

According to this embodiment, a user may access the server 200 through the terminal apparatus 300, and configure, i.e. edit the startup screen displayed on the display apparatus 101 connected to the image processing apparatus 102.

The terminal apparatus 300 receives information for configuring the startup screen of the display apparatus 101 from the server 200, and displays an editor for the startup screen generated based on the received information. The information for configuring the startup screen is related to the user information stored and managed in the server 200.

A user may use the editor displayed on the terminal apparatus 300 to make a user input for configuring the startup screen of the display apparatus 101, and the terminal apparatus 300 transmits such received user input information to the server 200.

In the foregoing display systems 10 and 11 according to the disclosure, the terminal apparatus 300 is additionally given for setting/editing the startup screen, i.e. the user screen of the display apparatuses 100 and 101, and the terminal apparatus 300 is more convenient to make a user input than the display apparatus 100 or the image processing apparatus 102 which is controlled by a remote controller, thereby solving a problem of inconvenience in editing the user screen. However, as an alternative embodiment of the disclosure, a user input for editing the user screen may be carried out by an input unit, i.e. a remote controller of the display apparatus 100 or the image processing apparatus 102

Below, detailed elements of the apparatuses in the display system according to an embodiment of the disclosure will be described with reference to the accompanying drawings.

Figure 3:
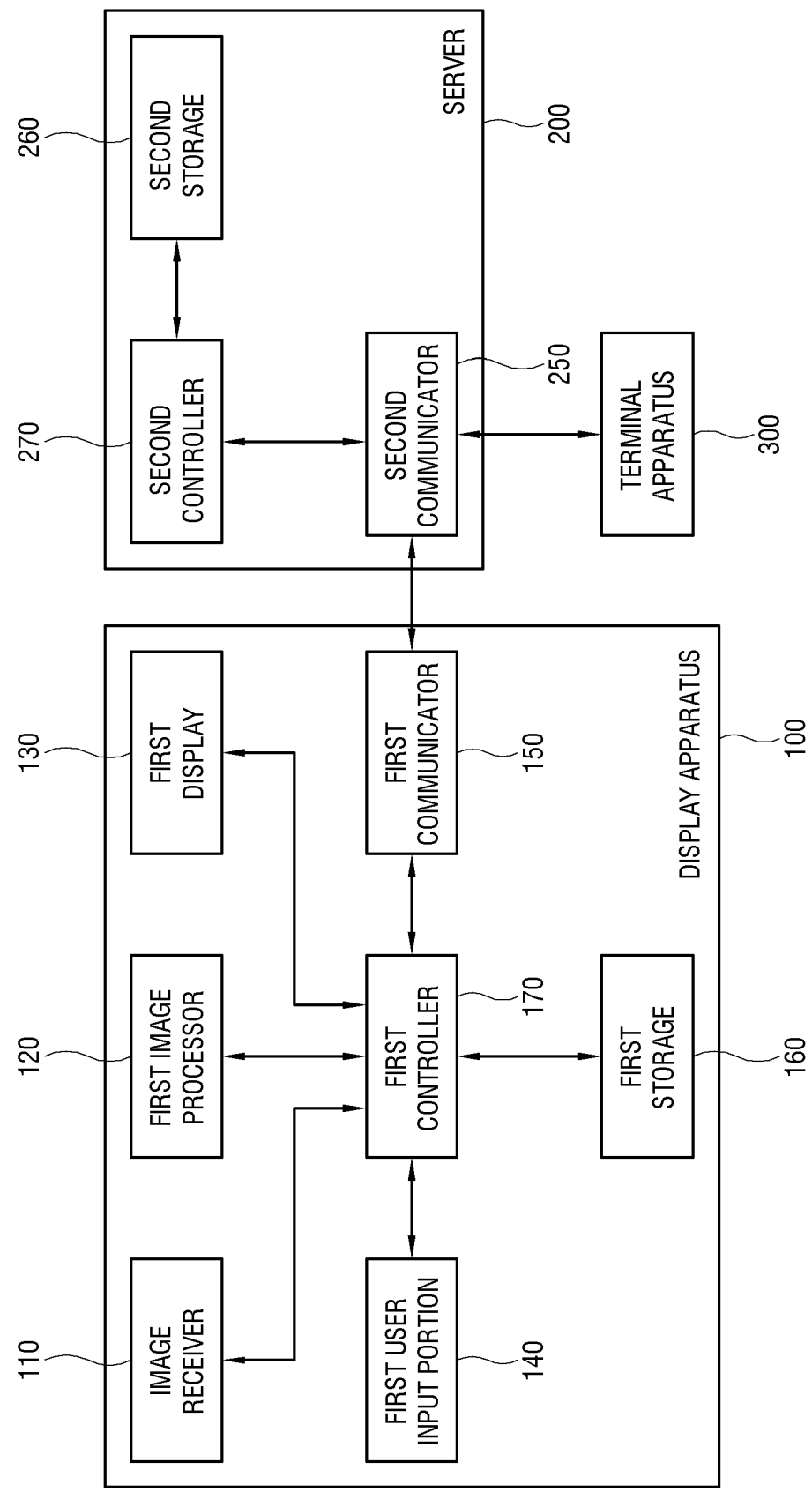
FIG. 3 is a block diagram of a display apparatus and a server according to an embodiment of the disclosure.
Figure 4:
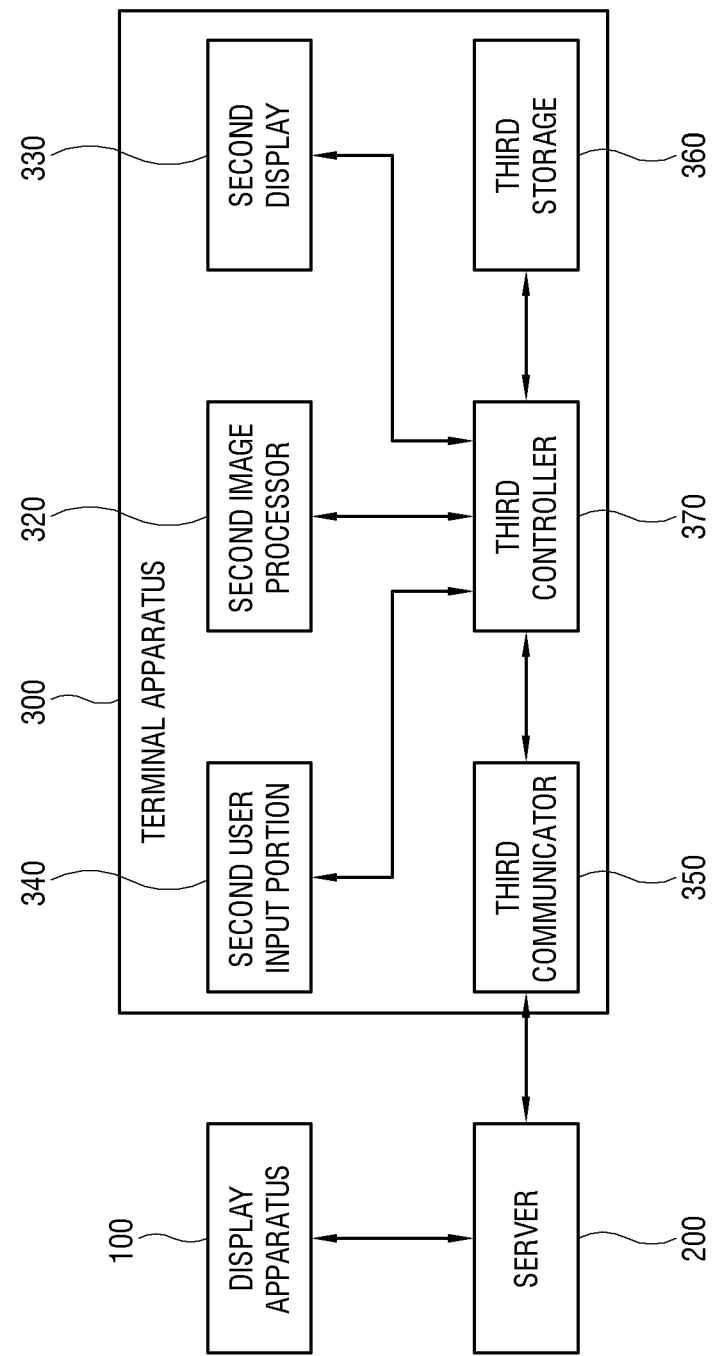
FIG. 4 is a block diagram of a terminal apparatus according to an embodiment of the disclosure.

FIG. 3 is a block diagram of the display apparatus 100 and the server 200 according to an embodiment of the disclosure, and FIG. 4 is a block diagram of the terminal apparatus 300 according to an embodiment of the disclosure.

As shown in FIG. 3, the display apparatus 100 includes an image receiver 110, a first image processor 120, a first display 130, a first user input portion 140, a first storage 160, a first communicator 150, and a first controller 170.

The image receiver 110 receives an image signal (i.e. content) from the outside and transmits it to the first image processor 120. The standards of the received signal may be varied depending on the types of the display apparatus 100. For example, the image receiver 110 may receive a radio frequency (RF) signal from a broadcasting station (not shown) wirelessly, or may receive an image signal based on composite video, component video, super video, syndicat des constructeurs des appareils radiorécepteurs et téléviseurs (SCART), HDMI and the like standards by a wire.

According to an embodiment, the image receiver 110 may include a tuner to be tuned to a channel for a broadcast signal when the image signal is the broadcast signal. Further, the image signal may be received from an external device, for example, a mobile device such as a smartphone, a tablet and the like smart pad, an MP3 player, a personal computer (PC) such as a laptop or desktop computer, etc. Further, the image signal may be based on data received through the Internet or the like network. In this case, the display apparatus 100 may receive the image signal through the first communicator 150 to be described later.

Further, the image signal may be based on data stored in a flash memory, a hard disk drive (HDD), and the like nonvolatile first storage 160. The first storage 160 may be provided inside or outside the display apparatus 100. When the first storage 160 is provided at the outside, a connector (not shown) may be added for connection with the first storage 160.

The first image processor 120 performs various preset video/audio processing processes with regard to the image signal received from the image receiver 110. The first image processor 120 outputs an output signal, which is generated or combined by performing such an image processing process, to the first display 130, so that the first display 130 can display an image based on the image signal.

The first image processor 120 includes a decoder for decoding an image signal to have an image format for the display apparatus 100, and a scaler for scaling the image signal according to the output standards of the first display 130. The decoder in this embodiment may for example be embodied by a moving picture experts group (MPEG) decoder. Here, there are no limits to the kinds of image processing process performed in the first image processor according to the exemplary embodiment. For example, the image processing process may perform at least one of various processes such as de-interlacing for converting an interlaced broadcast signal into a progressive broadcast signal, noise reduction for improving image quality, detail enhancement, frame refresh rate conversion, line scanning, etc.

The first image processor 120 may be embodied as each individual group for independently performing such a process, or as it is included in a system-on-chip (SoC) where various functions are integrated. A main SoC may include at least one microprocessor or central processing unit (CPU) as an example of the first controller 170 to be described later.

According to one embodiment, the first image processor 120 may be embodied by an image board including circuit elements such as various chipsets for performing respective processes, a memory, electronic parts, wirings, etc. are mounted on to a printed circuit board (PCB). In this case, the image receiver 110, the first image processor 120 and the first controller 170 of the display apparatus 100 may be provided on a single image board. Of course, this is merely an example, and the image receiver 110, the first image processor 120 and the first controller 170 of the display apparatus 100 may be arranged on a plurality of PCBs connecting and communicating with each other.

The image signal processed by the first image processor 120 is output to the first display 130. The first display 130 displays an image based on the image signal received from the first image processor 120.

There are no limits to the type of the first display 130. For example, the first display 130 may be embodied in various display types such as liquid crystal, plasma, light-emitting diodes, organic light-emitting diodes, a surface-conduction electron-emitter, a carbon nano-tube, nano-crystal, etc. The first display 130 may additionally include an appended element (e.g. a driver) according to the display types.

The first display 130 displays the startup screen corresponding to the user of the display apparatus 100. When the display apparatus 100 is powered on, the first controller 170 receives information about the startup screen matching the user from the server 200 and controls the information to be displayed on the first display 130.

The first user input portion 140 transmits various preset control commands or unrestricted information to the first controller 170 in response to a user's input.

The first user input portion 140 includes a keypad (or an input panel) including buttons such as a power key, a menu key, etc. provided in the main body of the display apparatus 100. According to one embodiment, the first user input portion 140 includes an input unit for generating a preset command/data/information/signal previously set for remotely controlling the display apparatus 100 and transmitting it to the display apparatus 100. The input unit is provided separately from the main body of the display apparatus 100 like a remote controller and allows a user to make an input. The remote controller may be provided with a touch sensor for sensing a user's touch input and/or a motion sensor for sensing its own motion caused by a user. The input unit may include a terminal apparatus such as a smart phone, in which a remote-control application is installed. In this case, the input unit may receive a user's touch input through a touch screen.

The input unit serves as an external apparatus for wireless communication with the main body of the display apparatus 100, and the wireless communication includes Bluetooth, infrared communication, radio frequency communication, wireless local area network (WLAN), Wi-Fi direct, etc.

According to an embodiment, the first user input portion 140 may further include a voice input unit to receive a sound/voice uttered by a user. The voice input unit may be embodied by a microphone to receive a voice signal.

According to an embodiment, the display apparatus 100 may control the first display 130 to display the startup screen, i.e. the user screen of a corresponding user in response to a predetermined event that occurs based on a user input or the like, for example, in response to control of a power button on a remote controller or an input panel while the display apparatus 100 is being powered off, control of a home button on the remote controller while the display apparatus 100 is operating, trigger voice utterance of a user, etc.

The first communicator 150 is configured to communicate with various external apparatuses such as the server 200, the terminal apparatus 300, the input unit provided as the user input portion 140 through a wired or wireless communication method. The first communicator 150 includes a wired and/or wireless communication module.

According to an embodiment, the first communicator 150 includes at least one module for short-range communication such as Bluetooth, Bluetooth low energy, infrared data association (IrDA), Wi-Fi Direct, Zigbee, ultra-wideband (UWB), near field communication (NFC), etc. The short-range communication module is provided to support direct communication between the display apparatus 100 and the external apparatus wirelessly without an access point (AP).

According to an embodiment, the first communicator 150 further includes a WLAN unit. The WLAN unit may wirelessly connect with the external apparatus through the AP under control of the first controller 170. The WLAN unit may include a Wi-Fi communication module.

According to an embodiment, the first communicator 150 may include a module for wired communication such as Ethernet, etc.

In the display apparatus 100 according to an embodiment of the disclosure, the first communicator 150 may include one among the short-range communication module, the WLAN unit and Ethernet, or combination of two or more of them in accordance with performance thereof.

According to an embodiment, the display apparatus 100 communicates with the server 200 through the first communicator 150. According to an alternative embodiment, the display apparatus 100 may directly communicate with the terminal apparatus 300. When the display apparatus 100 directly communicates with the terminal apparatus 300, the first storage 160 may be storing identification information (e.g. a media access control (MAC) address) about the apparatus to be targeted for the communication.

The first storage 160 is configured to store various pieces of data of the display apparatus 100. The first storage 160 may be embodied by a nonvolatile memory (e.g. a writable read only memory (ROM)) in which data is retained even though power supplied to the display apparatus 100 is cut off, and which writes and reflects changes. That is, the first storage 160 may be embodied by one of a flash memory, an erasable and programable read only memory (EPROM), and an electrically erasable and programmable read only memory (EEPROM). The first storage 160 may further include a volatile memory such as a dynamic random-access memory (DRAM) or a static random access memory (SRAM), of which the reading or writing speed of the display apparatus 100 is faster than the nonvolatile memory.

Data stored in the first storage 160 may for example include not only an operating system for operating the display apparatus 100, but also various applications to be run on the operating system, image data, appended data, etc.

Specifically, the first storage 160 may be configured to store a signal or data input/output corresponding to operations of the elements under control of the first controller 170. The first storage 160 may be configured to store a control program for controlling the display apparatus 100, a UI related to an application provided by a manufacturer or downloaded from the outside, images for providing the UI, user information, a document, a database, or associated data.

According to an embodiment, the first storage 160 may further include the user information of the display apparatus 100, and startup-screen information matching a corresponding user. The user information may include information for identifying a plurality of users who share the display apparatus 100, and the startup-screen information may be stored according to the plurality of users. The user information may be transmitted to the server 200 through the first communicator 150, and the startup-screen information may be received from the server 200 through the first communicator 150.

In this exemplary embodiment, the term 'storage' is defined to include the first storage 160, the ROM (not shown) in the first controller 170, the RAM (not shown), a memory card (for example, a micro secure digital (SD) card, and a memory stick) mountable to the display apparatus 100.

The first controller 170 performs control for operating general elements of the display apparatus 100. The first controller 170 may include a control program (or instruction) for implementing such a control operation, a nonvolatile memory in which the control program is installed, a volatile memory in which at least a part of the installed control program is loaded, and at least one processor or CPU for executing the loaded control program.

The processor may include a single-core processor, a dual-core processor, a triple-core processor, a quad-core processor, and the like multiple-core processor. The processor may include a plurality of processors, for example, a main processor and a sub processor that operates in a sleep mode, e.g. when the content providing apparatus receives only standby power and does not fully operates. Further, the processor, the ROM and the RAM may be connected to one another via an internal bus.

When the display apparatus 100 according to an embodiment of the disclosure is embodied by a monitor, the first controller 170 may further include a graphic processing unit (GPU, not shown) for graphic processing.

Further, when the display apparatus 100 according to an alternative embodiment of the disclosure is embodied by a digital TV, a processor may include a GPU. For example, the processor may be embodied in the form of a SoC where a core and the GPU are combined.

The processor, which is an example of the first controller 170 according to an exemplary embodiment, may be achieved as included in a main SoC mounted to a built-in PCB of the display apparatus 100. Alternatively, the main SoC may further include the first image processor 120 for processing an image signal.

The control program may include a program(s) achieved in the form of at least one among a basic input/output system (BIOS), a device driver, an operating system, a firmware, a platform, and an application. According to one exemplary embodiment, the application may be previously installed or stored in the display apparatus 100 when the display apparatus 100 is manufactured, or may be installed in the display apparatus 100 for use in the future on the basis of data received corresponding to the application from the outside. The data of the application may for example be downloaded from an external server such as an application market to the display apparatus 100. Such an external server is an example of a computer program product according to an exemplary embodiment, but not limited thereto.

According to an embodiment, the first controller 170 performs communication with the server 200 through the first communicator 150. The first controller 170 controls the first communicator 150 to transmit the user information of the display apparatus 100 to the server 200. Here, the first controller 170 may control the first communicator 150 to transmit the user information to the server 200 in response to occurrence of a predetermined event (e.g. the first edit or edit change of the display apparatus 100). According to an alternative embodiment, the user information may be periodically transmitted to the server 200.

Further, the first controller 170 controls the first communicator 150 to receive information about the startup screen corresponding to the user of the apparatus 100 from the server 200, and controls the first display 130 to display the startup screen based on the received information.

According to one exemplary embodiment, the operations of the first controller 170 may be achieved by a computer program stored in the computer program product (not shown) provided separately from the display apparatus 100.

In this case, the computer program product includes a memory where an instruction corresponding to the computer program is stored, and a processor. The instruction may be issued to transmit the user information to the server 200, receive the startup-screen information from the server 200, and display the startup screen in response to the reception of the startup-screen, when the instruction is executed by the processor.

Thus, the display apparatus 100 downloads and executes the computer program stored in a separate computer program product, thereby performing the operations of the first controller 170.

Meanwhile, according to the embodiment shown in FIG. 2, the corresponding elements for performing the operations of the image receiver 110, the first image processor 120, the first user input portion 140, the first communicator 150, the first storage 160 and the first controller 170 of the display apparatus 100 shown in FIG. 3 are provided in the image processing apparatus 102.

In other words, the image processing apparatus 102 receives and processes an image signal, provides the image signal to be displayed as a corresponding image on the display apparatus 101 connected by, for example, the HDMI, and performs operations corresponding to various commands received through its own user input portion, for example, controls the display apparatus 101 to display an image of a selected channel.

Further, the image processing apparatus 102 is storing the user information in its own storage, and transmits the user information to the server 200 through the communicator. Here, the image processing apparatus 102 may transmit the user information to the server 200 in response to occurrence of a predetermined event (e.g. the first edit or edit change of the image processing apparatus 102) or periodically.

Further, the image processing apparatus 102 receives a user's startup-screen information from the server 200 through the communicator, and controls the corresponding startup screen to be displayed on the display apparatus 101.

Here, the image processing apparatus 102 may control the startup screen, i.e. the user screen matching the corresponding user to be displayed on the display apparatus 101 in response to a predetermined event that occurs based on a user input or the like, for example, power-button control on the remote controller or the input panel in the power-off state, home-button control on the remote controller during the operations of the display apparatus 101 and the image processing apparatus 102, a user's trigger voice utterance, etc.

In other words, it will be understood that operations related to network communication with the server 200 to be described later and associated display of the user screen are performed by the first controller 170 of the display apparatus 100 or the controller of the image processing apparatus 102.

As shown in FIG. 3, the server 200 includes a second communicator 250, a second storage 260, and a second controller 270.

The second communicator 250 performs wired and/or wireless network communication with the display apparatus 100 or the image processing apparatus 102. The second communicator 250 may be provided corresponding to the wired/wireless communication module of the first communicator 150 described above. The server 200 receives the user information from the display apparatus 100 or the image processing apparatus 102 through the second communicator 250.

According to an embodiment, the second communicator 250 further performs the wired and/or wireless network communication with the terminal apparatus 300. The server 200 may transmit information for editing the startup screen, i.e. the user screen of the display apparatus 100, 101 to the terminal apparatus 300 through the second communicator 250, and receive information about a user input made in the terminal apparatus 300 and editing the user screen.

According to an embodiment, the server 200 may further receive the user information from other electronic apparatuses such as the terminal apparatus 300, which are accessible by the same account as that of the user of the display apparatus 100 or the image processing apparatus 102. In other words, the server 200 may be an example of an apparatus (for example, database management system (DBMS)) which collectively manages the user information collectable from a plurality of apparatuses accessible by a predetermined user account.

The second storage 260 is configured to store the user information of the display apparatus 100 or the image processing apparatus 102 and information about the startup screen, i.e. the user screen set for the corresponding user. The information about the user screen stored in the second storage 260 is changed, i.e. updated in response to a user input received from the terminal apparatus 300.

The features of the second storage 260 in the server 200 shown in FIG. 3 correspond to those of the first storage 160 of the display apparatus 100 described previously.

The second controller 270 controls the second storage 260 to store the user information received from the display apparatus 100 or the image processing apparatus 102, and controls the second communicator 250 to provide an edit screen including an editor by which the user screen is set as the startup screen for the matching user, to the user through the terminal apparatus 300.

Further, the second controller 270 produces information about the user screen so as to correspond to a user input made through the edit screen displayed on the terminal apparatus 300 and store the produced information in the second storage 260.

The second controller 270 transmits the stored information about the user screen to the display apparatus 100 or the image processing apparatus 102 through the second communicator 250 so that the information can be displayed on the display apparatus 100, 101.

According to an embodiment, the second controller 270 may include a display processor configured to process, i.e. render the user screen and the edit screen to be suited for the display of the display target.

According to an embodiment, the second controller 270 may include an input processor configured to receive and process a signal from the terminal apparatus 300 based on an input operation made on the edit screen for editing the user screen.

According to an embodiment, the second controller 270 may include a data manager configured to manage the user information (identification information and subscription service information), and store and manage the user screen information, a basic template provided by a service provider such as a manufacture of the display apparatus or the image processing apparatus, etc.

The features of the second controller 270 in the server 200 shown in FIG. 3 correspond to those of the first controller 170 of the display apparatus 100 described previously.

According to an embodiment, the information about the user screen may be provided through even the terminal apparatus 300. For example, a user may use the terminal apparatus 300 to access a mobile TV service while using the TV i.e. the display apparatus 100 by one user account. The second controller 270 of the server 200 configures, i.e. renders the user screen suited for the screen size of the display apparatus 100, 101 or the terminal apparatus 300, i.e. the apparatus using the service based on the information about the user screen stored in the second storage 260, and controls the second communicator 250 to provide the corresponding data to the display apparatus 100, 101 or the terminal apparatus 300, thereby providing a user customized screen.

The terminal apparatus 300 may wirelessly connect with other apparatuses such as the server 200 and transmit/receive a control signal. According to an embodiment, the terminal apparatus 300 is defined as an apparatus that includes a touch screen and is capable of transmitting/receiving data through a communicator 350. According to an alternative embodiment, the terminal apparatus 300 may be defined as an apparatus that receives a user input through a mouse, a keyboard or the like input unit and performs network communication through the communicator 350.

As shown in FIG. 4, the terminal apparatus 300 includes a second image processor 320, a second display 330, a second user input portion 340, a third communicator 350, a third storage 360, and a third controller 370.

The second image processor 320 may include a broadcast communication unit, an audio reproducing unit, or a moving-image reproducing unit. The broadcast communication unit may receive a broadcast signal (for example, a TV broadcast signal, a radio broadcast signal or a data broadcast signal) and broadcast appended information (for example, electric program guide (EPG) or electric service guide (ESG)) from an external broadcasting station through a broadcast communication antenna, under control of the third controller 370. Further, the second image processor 320 may process the received broadcast signal and broadcast appended information to be reproduced in the display 330 and/or a loudspeaker by a video codec unit and/or an audio codec unit.

In addition, it will be understood by a person having an ordinary skill in the art that many kinds of video and audio codec units have been produced and marketed.

According to an embodiment, the second image processor 320 may include the audio reproducing unit and the moving-image reproducing unit except the broadcast communication unit according to the performance or structure of the terminal apparatus 300. Further, according to an alternative embodiment, the audio reproducing unit and/or the moving-image reproducing unit of the second image processor 320 may be included in the third controller 370.

The second display 330 displays an image based on an image signal processed by the second image processor 320. There are no limits to the type of the display 330, and the display 330 may further include a driver or the like additional elements according to its types. The features of the second display 330 in the terminal apparatus 300 shown in FIG. 4 correspond to those of the first display in the display apparatus 100 described above.

The second display 330 displays the editor i.e. the edit screen for editing the user screen to be displayed as the startup screen on the display apparatus 100, 101. The edit screen is configured with reference to the user information stored in the server 200, and the information about the edit screen is transmitted from the server 200 to the terminal apparatus 300 through the third communicator 350. The second display 330 displays the edit screen based on the received information.

The second display 330 may display an object (for example, a menu, a text, an image, a moving image, a figure, an icon, and a shortcut icon), which includes menu items of the terminal apparatus 300, as a user interface (UI). A user may make a user input by selecting the object displayed on the second display 330 with the input unit such as a user's finger or the like body, a stylus, a pointing device, a mouse, etc.

In the terminal apparatus 300 according to the embodiment of FIG. 4, the second user input portion 340 may be defined to include at least one of a physical button, a keypad displayed on a touch screen, an additional input unit (e.g. a stylus, a pointing device, etc.) enabling a user to make a touch input, an input unit (e.g. a mouse, a keyboard, etc.) connectable to the terminal apparatus, or a microphone capable of receiving a user's voice/sound.

The second user input portion 340 may receive a touch caused by a user's body (e.g. a finger) on the touch screen. The second user input portion 340 transmits various preset control commands or information to the third controller 370, in response to a user's input including a touch input. According to an embodiment, the second user input portion 340 of the terminal apparatus 300 may receive a user's interaction, i.e. gesture input with regard to content displayed on the display 330.

The second user input portion 340 may include at least one of one or more than two buttons, a microphone, a keypad, or an input unit. The button in the terminal apparatus 300 according to an embodiment includes not only a physical button but also a touch button provided on the touch screen. The touch button may be displayed as a text or an icon on the display 330. The keypad includes at least one of a physical keypad formed on the front of the terminal apparatus 100, a virtual keypad displayed on the second display 330, or an external keypad (e.g. a keyboard dock) connected by a wire or wirelessly.

The second user input portion 340 is configured to receive various user inputs to the editor on the user screen displayed on the second display 330, and transmit such received user input information to the server 200.

The third communicator 350 of the terminal apparatus 300 may be provided corresponding to the communication standards of the second communicator 250 of the server 200, and include at least one of a WLAN unit or a short-range communicator.

According to an embodiment, the third communicator 350 may further include a mobile communicator. The mobile communicator may connect with an external apparatus by one or more than two antennas based on mobile communication under control of the third controller 370. The mobile communicator transmits and receives a wireless signal for a voice call, a video call, a short message service (SMS), a multimedia messaging service (MMS) and data to and from a cellular phone, a smartphone, a tablet PC, or other terminal apparatuses (e.g. portable apparatuses) having a phone number connectable with the terminal apparatus 300.

According to an embodiment, the terminal apparatus 300 performs communication with the server 200 through the third communicator 350. According to an alternative embodiment, the terminal apparatus 300 may perform direct communication with the display apparatus 100 or the image processing apparatus 102. When the terminal apparatus 300 performs direct communication with the display apparatus 100 or the image processing apparatus 102, the third storage 360 may be storing identification information (e.g. a MAC address) about an apparatus targeted for communication.

The third storage 360 is configured to store various pieces of data of the terminal apparatus 300. The features of the third storage 360 in the terminal apparatus 300 shown in FIG. 4 correspond to those of the first storage 160 of the display apparatus 100 described above.

Data stored in the third storage 360 may for example include not only an operating system for operating the terminal apparatus 300, but also various applications to be run on the operating system, image data, appended data, etc. The third storage 360 may be configured to store a control program for controlling the terminal apparatus 300, information about a UI provided by a manufacturer or received from the server 200 or the like outside, images for providing the UI, data related to user information, etc.

According to an embodiment, the third storage 360 may be configured to further store information for editing the user screen, received from the server 200, for example, information about the edit screen and information about a user input to the edit screen.

The third controller 370 performs control for operating general elements of the terminal apparatus 300. The features of the third controller 370 in the terminal apparatus 300 shown in FIG. 4 correspond to those of the first controller 170 of the display apparatus 100 described above.

The third controller 370 of the terminal apparatus 300 according to the embodiment shown in FIG. 4 receives the editor information for editing the startup screen, i.e. the user screen of the display apparatus 100, 101 from the server 200 through the third communicator 350, and displays the edit screen generated based on the received information on the second display 330.

The third controller 370 controls the third communicator 350 to transmit the user input information about the edit screen received through the second user input portion 340 to the server 200, thereby allowing the server 200 to continuously update and manage the corresponding information.

Below, control operations performed in the display system 10, 11 according to an embodiment of the disclosure will be described with reference to the accompanying drawings.

Figure 5:
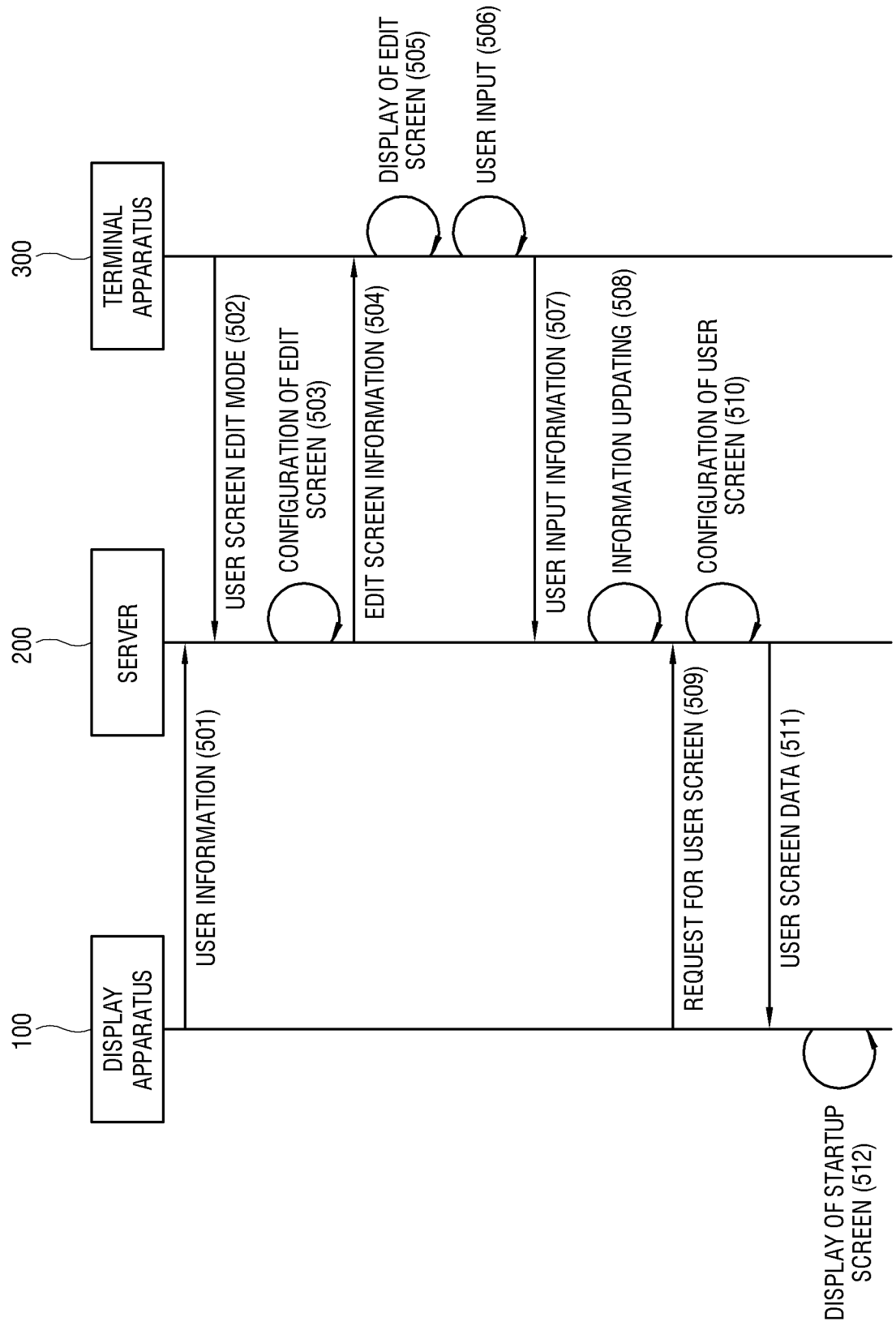
FIG. 5 illustrates operations between a display apparatus, a server and a terminal apparatus in a system according to an embodiment of the disclosure.
Figure 6:
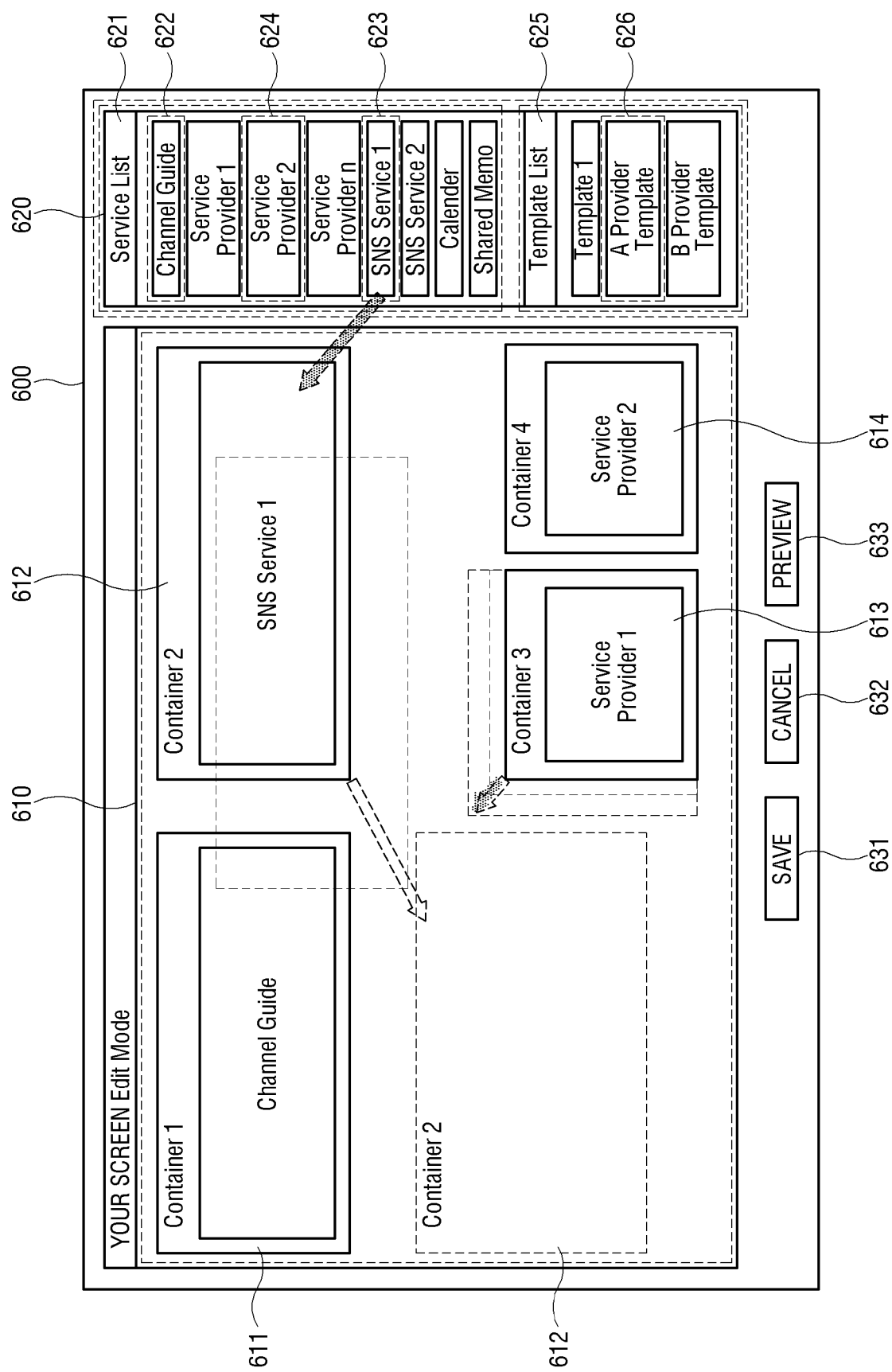
FIG. 6 illustrates an edit screen displayed according to the embodiment of FIG. 5.
Figure 7:
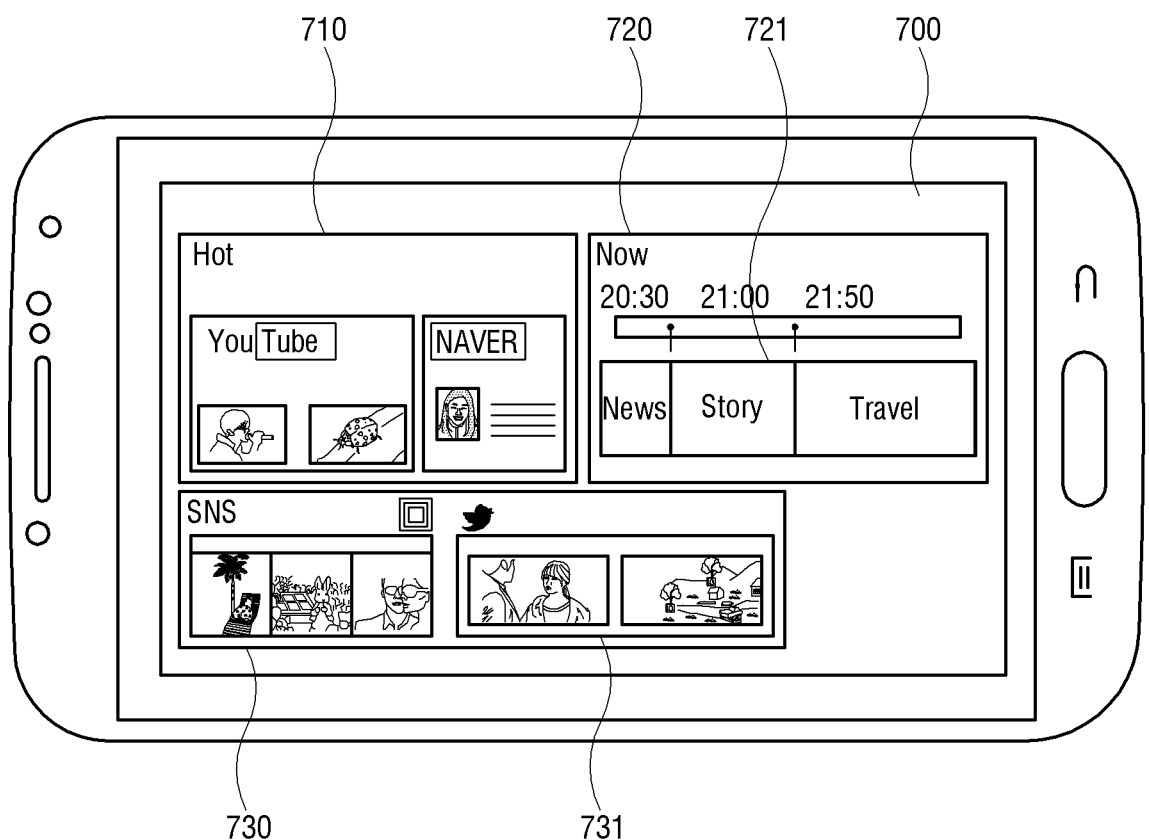
FIGS. 7 and 8 illustrate set user-screens displayed according to the embodiment of FIG. 5.
Figure 8:
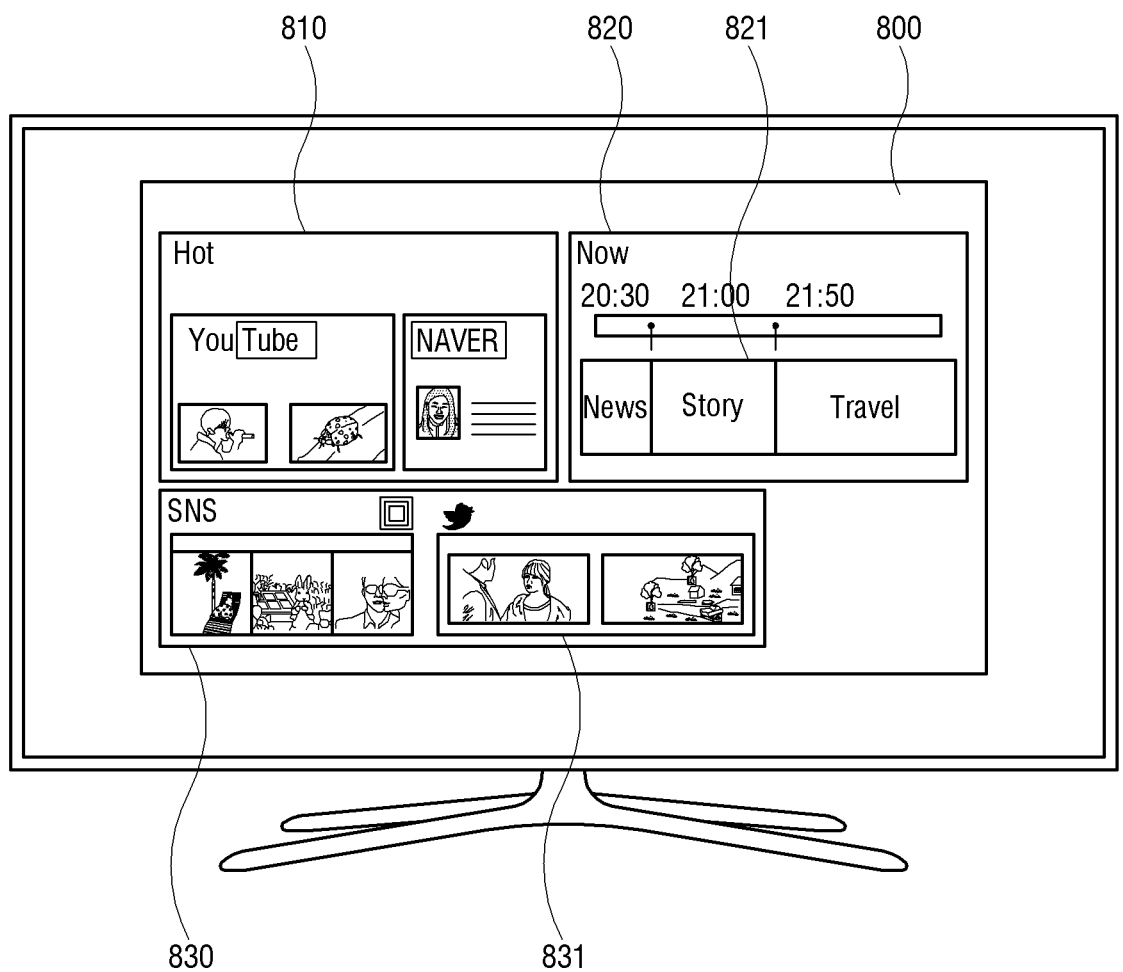

FIG. 5 illustrates operations between the display apparatus 100, the server 200 and the terminal apparatus 300 in the system 10 according to an embodiment of the disclosure, FIG. 6 illustrates an edit screen 600 displayed according to the embodiment of FIG. 5, and FIGS. 7 and 8 illustrate the set user-screens displayed according to the embodiment of FIG. 5.

As shown in FIG. 5, the display apparatus 100 such as the smart TV according to an embodiment of the disclosure transmits the user information to the server 200 (501).

Here, the first controller 170 may control the first communicator 150 to transmit the user information at the first edit for the display apparatus 100. The point in time of the first edit includes a moment when a user installs the display apparatus 100 at home and logs on the display apparatus 100 with a user account for the first time, or a moment when various user edits (e.g. favorite channel edit, etc.) are performed for the first time after the log-on. When the display apparatus 100 is shared by the plurality of users, the user information may be transmitted whenever each user account is set for the first time.

According to an embodiment, the first controller 170 may detect whether a user edit is changed, and control the first communicator 150 to further transmit the user information to the server 200 when the user edit is changed. According to an alternative embodiment, the first controller 170 may control the first communicator 150 to periodically transmit the user information to the server 200 in a predetermined cycle.

The transmitted user information is stored and managed by the server 200. The user information stored and managed by the server 200 is not limited to that transmitted from the display apparatus 100. For example, the user information, which is received from the terminal apparatus 300 and the like apparatuses accessible by the same user account as that used in accessing the display apparatus 100, may also be stored and managed by the server 200. Further, the server 200 may receive, store and manage information about the apparatuses accessible by the one user account (for example, specification information about the display apparatus 100 or the terminal apparatus 300 including the size and resolution of the display 130, 330, information about installed applications, etc.)

The user information includes account information of a matching user, i.e. identification (ID)/password, a user voice and the like user identification information; Internet protocol (IP) information about a location/zone where the display apparatus 100 is installed; social network services/sites (SNS), really simple syndication or rich site summary (RSS), news curation (also called a newscast or newsstand) or the like service information to which a user subscribes using the display apparatus 100, the terminal apparatus 300 or the like apparatus; a broadcast, a movie or the like preferred content information; a calendar, a memo or the like service information used by a user through various apparatuses.

The terminal apparatus 300 may receive a user input to enter a user screen edit mode for editing the startup screen, i.e. the user screen of the display apparatus 100. The third controller 370 of the terminal apparatus 300 controls the third communicator 350 to transmit a received command for entering the user screen edit mode to the server 200 (502).

The second controller 270 of the server 200 identifies the configuration of the edit screen for editing the user screen (503). Here, the second controller 270 may identify the configuration of the edit screen based on the user information stored in the second storage 260. The edit screen configured according to the identification results is rendered corresponding to the size and resolution of the second display 330 of the terminal apparatus 300.

The second controller 270 transmits information about the edit screen configured and rendered as described above to the terminal apparatus 300 through the second communicator 250 (504).

The third controller 370 of the terminal apparatus 300 receives the information about the edit screen through the third communicator 350, and controls the second display 330 to display the edit screen 600 as shown in FIG. 6 based on the received information (505).

The edit screen 600 includes a screen editor as a graphic tool for editing layouts of containers forming the user screen and content and service to be included in the container. The server 200 may configure the screen editor by automatically making and loading a service list and a template list to be displayed on the user screen of a corresponding user based on the information in the second storage 260.

As shown in FIG. 6, the edit screen 600 displayed in the user screen edit mode of the terminal apparatus 300 is divided into a plurality of regions 610 and 620, and lays out, i.e. arranges items in the region. According to an embodiment, the edit screen 600 is displayed at a predetermined position (for example, a lower side of the screen), and includes one or more buttons 631, 632 and 633 selectable by a user.

The plurality of regions includes a first region (hereinafter, referred to as a main region) 610 and a second region (hereinafter, referred to as an item region) 620. The main region 610 displays at least one of containers 611, 612 and 613 in which content provided by the display apparatus 100 is positioned. A user may make a user input for editing the layout, for example, deleting at least one of the containers in the main region 610, adding a new container, resizing the container, changing the position of the container, etc. through the user input portion 340.

The item region 620 displays one or more lists 621 and 625 to which items 622, 623 and 626 selectable by a user belong. Referring to FIG. 6, the item region 620 according to an embodiment may display a service list 621 and a template list 625.

The items 622 and 623 in the service list 621 may be generated based on the user information stored in the server 200. For example, the service list 621 includes a channel guide item 622 based on preferred content of a user, an SNS item 623 for selecting a user's favorite SNS service, and a service item 624 provided by a service provider (e.g. a portal operator) and allowing a user to select a predetermined service to which the user subscribes. Further, the service list 621 may further include items for various services usable with the user account, for example, a calendar, a memo, etc.

Items 626 in the template list 625 correspond to basic templates provided by the manufacturer of the display apparatus 100, a broadcast content provider such as a broadcasting station, a broadcast/communication business operator, etc. The basic templates may be provided by one or more providers, and configured by the server 200 as included in the edit screen.

As described above, the edit screen configured and rendered in the server 200 is transmitted to the terminal apparatus 300, and the terminal apparatus 300 receives a user input through the second user input portion 340 with respect to the edit screen 600 displayed as shown in FIG. 6 (506).

Referring to FIG. 6, a user selects one item 623 in the item region 620, and drags or drags & drops the selected item 623 to a certain container 612 in the container region 610, thereby selecting content desired to be registered to the user screen.

Further, a user may perform a tap or click to select a certain container 613, and drags an outline in the selected state, thereby adjusting the size of the container 613. Further, a user may perform a long tap to select a certain container 612, and drag or drag & drop the selected container 612 to another position within the main region 610, thereby moving the container 612. Further, a user may perform a long tap to select a certain container 611, and flick the selected container 611 to the outside of the main region 610, thereby deleting the container 611.

The method of making a user input on the edit screen 600 according to the disclosure is not limited to the example so the foregoing embodiment, and may include various touch/gesture inputs usable in the present art and corresponding screen edit/control methods.

A user may select a 'SAVE' button 631 to store the user input onto the edit screen 600. The third controller 370 of the terminal apparatus 300 controls the third communicator 350 to immediately transmit the user input information corresponding to a stored history to the server 200. The user input information received in the server 200 is stored, i.e. updated in the second storage 260, and thus the user screen information is continuously managed in the server 200.

A user may select a 'PREVIEW' button 633 to check a user screen generated in response to a user input onto the edit screen 600.

As shown in FIG. 7, a preview user screen 700 includes a plurality of regions 710, 720 and 730, and each region displays content corresponding to the user input onto the edit screen 600.

For example, a broadcast main region 720 may display a user's favorite channels 721 corresponding to the channel guide item 622 selected in the item region 620. A social main region 730 may display SNS content 731 corresponding to the SNS item 623 selected in the item region 620. An up-to-date main region 710 may display up-to-date content or popular content 711 corresponding to the service item 623 of the business operator selected in the item region 620 and provided from a portal or the like service provider.

The preview user screen 700 shown in FIG. 7 corresponds to the startup screen, i.e. the user screen displayed in the display apparatus 100. However, the preview user screen 700 is subjected to video processing and then displayed corresponding to the size and resolution of the third display 330 of the terminal apparatus 300.

A user can easily edit the user screen while checking the user screen actually displayed through the preview user screen 700 shown in FIG. 7 on the way of editing the user screen through the edit screen 600 of FIG. 6.

The third controller 370 of the terminal apparatus 300 transmits the received information about the user input to the server 200 through the third communicator 350 (507).

The second controller 270 of the server 200 receives the user input information for the edit screen 600 from the terminal apparatus 300 through the second communicator 250, and controls the second storage 260 to store, i.e. be updated with the received information (508).

According to an embodiment, a user may edit the user screen to be used as the startup screen of the display apparatus 100 based on the foregoing user input onto the edit screen 600 of the terminal apparatus 300, and such edition of the user screen may be repetitively performed by a user as necessary.

The server 200 immediately reflects the information about the user input, which is repetitively made as described above through the communication with the terminal apparatus 300, in the previously stored user screen information, i.e. updates the previously stored user screen information with the information about the user input, thereby configuring and providing the latest user screen to the display apparatus 100.

The first controller 170 of the display apparatus 100 may control the first communicator 150 to make a request for the startup screen displayed on the first display 130 i.e. the user screen matching the user, who logs on to the display apparatus 100, to the server 200 (509).

Here, the first controller 170 may control the first communicator 150 to transmit a command for making a request for the user screen to the server 200 in response to a predetermined event that occurs based on a user input or the like, for example, power-button control on the remote controller or the input panel in the power-off state, home-button control on the remote controller during the operations of the display apparatus 100, a user's trigger voice utterance, etc.

For example, when a user utters a voice corresponding to a preset command while the display apparatus 100 is being powered on, i.e. while watching broadcast content, the first user input portion 140, i.e. the microphone receives voice data, and the first controller 170 identifies this voice as a trigger voice. The first controller 170 identifies a current user based on comparison between the received voice data w the received voice data and user identification data of the first storage 150, and controls the first communicator 150 to make a request for information about the user screen matching the identified user to the server 200.

The second controller 270 of the server 200 loads, i.e. configures the user screen matching the user based on the information about the user screen stored in the second storage 250, in response to the request for the user screen from the display apparatus 100 (510). Here, the second controller 270 may render and configure the user screen to correspond to the format i.e. the screen size and resolution of the display apparatus 100

The data of the user screen configured in the server 200 is transmitted to the display apparatus 100 through the second communicator 250 (511).

Further, the first controller 170 of the display apparatus 100 controls the first image processor 120 to display a user screen 800 as shown in FIG. 8 on the first display 130 based on the received data (512).

The user screen of FIG. 8 displayed on the display apparatus 100 corresponds to the preview user screen 700 of FIG. 7 and is displayed as subjected to video processing corresponding to the format of the first display 130.

Specifically, the user screen 800 includes a plurality of regions 810, 820 and 830, and each region displays content corresponding to the user input on to the edit screen 600.

For example, a broadcast main region 820 may display a user's favorite channel content 821 corresponding to the channel guide item 622 selected in the item region 620. Here, the broadcast main region 820 may display pieces of broadcast content provided through different channels according to timeslots, and the pieces of displayed broadcast content correspond to the preferred channels or the preferred content information stored in the server 200 as the user information.

A social main region 830 may display SNS content 831 corresponding to the SNS item 623 selected in the item region 620. The SNS content 831 displayed on the social main region 830 corresponds to a user account that logs on to the display apparatus 100.

An up-to-date main region 810 may display up-to-date content or popular content 811 corresponding to the service item 624 of the business operator selected in the item region 620 and provided from a portal or the like service provider. According to an embodiment, the content 811 displayed in the up-to-date main region 810 may selected by the service provider based on the user information (e.g. ages, residential areas, sex, etc.) of the display apparatus 100.

According to an embodiment, a user may use a mobile TV service through the terminal apparatus 300 with the same account as that for the display apparatus 100. In this case, user screen data rendered corresponding to the second display apparatus 330 of the terminal apparatus 300 is received from the server 200 and displayed. Therefore, the user screen displayed in the terminal apparatus 300 corresponds to the preview user screen 700 shown in FIG. 7.

Figure 9:
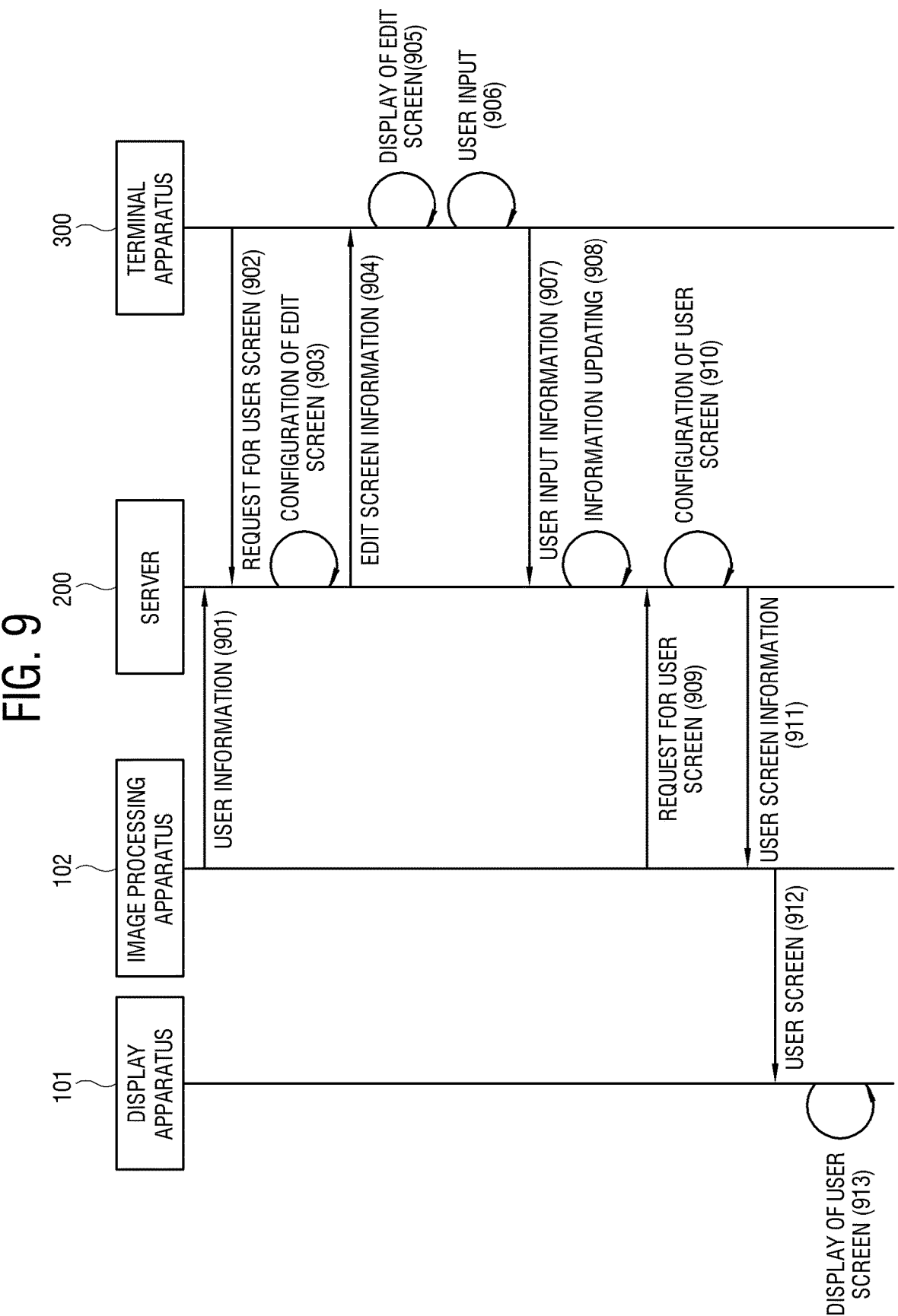
FIG. 9 illustrates operations between a display apparatus, an image processing apparatus, a server and a terminal apparatus in a system according to another embodiment of the disclosure.

FIG. 9 illustrates operations between the display apparatus 101, the image processing apparatus 102, the server 200 and the terminal apparatus 300 in a system 11 according to another embodiment of the disclosure.

In the embodiment shown in FIG. 9, operations of transmitting the user information from the image processing apparatus 102 connecting with the display apparatus 101 to the server 200 (901), entering the user screen edit mode in the server 200 receiving the user information and the terminal apparatus 300 (902), configuring the edit screen for editing the user screen (903), transmitting the information (904), displaying the information (905), receiving and transmitting a user input (906, 907), updating the information (908), and configuring the user screen (910) are the same as those 502 to 510 described in FIG. 5.

The image processing apparatus 102 may make a request for the user screen matching a logon user to the server 200 in response to the power button control, the home button control, the trigger voice, etc. (909), and the server 200 transmits the user screen data matching the corresponding user to the image processing apparatus 102 (911).

Further, the user screen is transmitted from the image processing apparatus 102 to the display apparatus 101 (912), and displayed on the display apparatus 101 (913).

The foregoing operations described with reference to FIGS. 5 and 5 are given as an example of interaction procedures between the apparatuses in the systems 10 and 11, and the order thereof is not limited to the shown order. Alternatively, two or more operations may be simultaneously performed, or one operation may be performed repetitively or at predetermined intervals.

Below, a method of controlling the server 200 according to this embodiment will be described with reference to the accompanying drawings.

Figure 10:
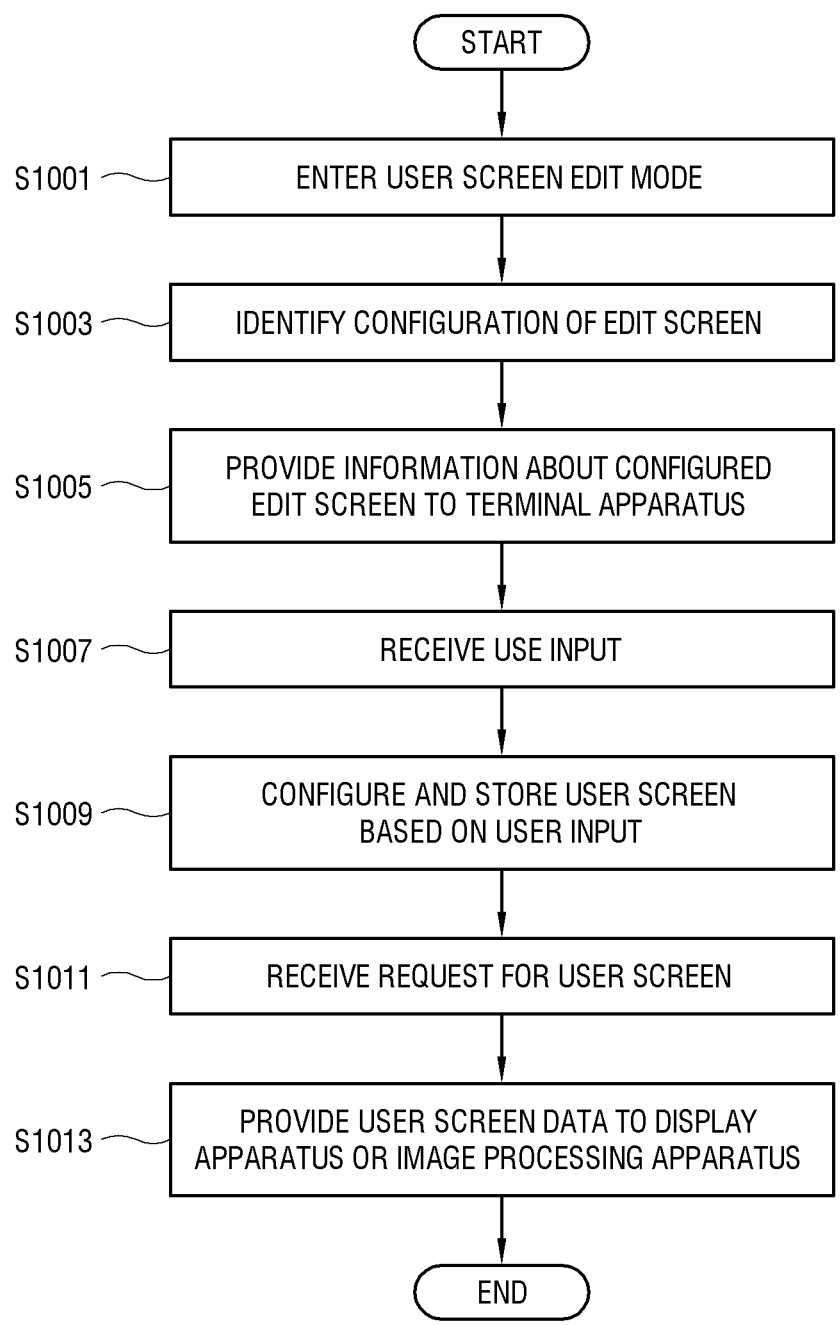
FIG. 10 is a flowchart showing a control method of a server according to an embodiment of the disclosure.

FIG. 10 is a flowchart showing a control method of the server 200 according to an embodiment of the disclosure.

In the embodiment of FIG. 10, the server 200 is storing and managing the user information received from the display apparatus 100 or the image processing apparatus 102. Further, the server 200 may collect, store and manage the user information from other apparatuses, which are accessible by the same user account, such as the terminal apparatus 300.

As shown in FIG. 10, the server 200 receives a user input for entering the user screen edit mode in the terminal apparatus 300 (S1001). Here, the user input for entering the user screen edit mode is received through the second user input portion 340 of the terminal apparatus 300, and immediately transmitted to the server 200 through the third communicator 350.

The server 200 identifies the configuration of the edit screen for editing the user screen in response to the user input in the operation S1001 (S1003). Here, the configuration of the edit screen includes a layout and data displayed within the layout, and is identified based on the user information stored and managed in the server 200.

When the configuration of the edit screen is identified, the server 200 provides the information about the configured edit screen to the terminal apparatus 300 (S1005). The terminal apparatus 300 receives the information about the edit screen, and displays the information on the second display 330 as shown in FIG. 6.

When a user input is received with regard to the edit screen 600 displayed on the terminal apparatus 300, information about the received user input is transmitted to the server 200 (S1007).

The server 200 configures and stores the user screen based on the user input received in the terminal apparatus 300 (S1009). Here, the server 200 maintains the communication connection with the terminal apparatus 300, and continuously receives the information about user inputs received a plurality of times in the terminal apparatus 300, thereby storing, i.e. updating the information.

In the state that the user screen configured as above is stored, the server 200 may receive a request for the user screen from the display apparatus 100 or the image processing apparatus 102 (S1011).

In response to the request in the operation S1011, the server 200 provides user screen data to the display apparatus 100 or the image processing apparatus 102 (S1013). The user screen 800 based on the provided data is displayed as the startup screen in the display apparatus 100, 101 as shown in FIG. 8.

According to various embodiments of the disclosure as described above, a user can use the edit screen 600 to directly edit, i.e. configure a user screen to be displayed as the startup screen of the display apparatus 100, and it is thus possible to provide the personalized user screen focused on information desired by the user.

In particular, according to the disclosure, the user screen personalized for a specific user who is in a log-on state is provided, and therefore the user can have customized experience even in an apparatus shared by a plurality of users.

Further, according to the disclosure, an edit tool for editing the user screen is provided through the edit screen, and it is thus easy and convenient for a user to have the user's own user screen through the tool without any technical difficulty.

Further, according to the disclosure, both the user information and the user screen information are stored and managed as transmitted to the server 200 in a cloud form of a cloud. Therefore, not only the personalized user screen is easily usable in all user apparatuses regardless of the OS of the display apparatus 100, 101 or the terminal apparatus 300, but also there are no needs of separately storing or installing the data in the display apparatus 101, 101 or the terminal apparatus 300, thereby improving convenience for a user.

Although a few exemplary embodiments have been shown and described, it will be appreciated that changes may be made in these exemplary embodiments without departing from the scope defined in the appended claims.

What is claimed is:

1. A terminal apparatus comprising:
a user input portion;
a display;
a communicator configured to communicate with a server; and
a processor configured to:
based on a user input to enter a user screen edit mode for editing a user screen of an external display apparatus which is associated with a user being received through the user input portion, transmit information indicating entrance to the user screen edit mode and user information of the user to the server through the communicator,
receive edit screen information generated based on the user information of the user and used for setting the user screen of the external display apparatus from the server through the communicator,
control the display to display an edit screen based on the received edit screen information, and
control the communicator to transmit information to update the user screen according to the user input received through the user input portion with regard to the edit screen to the server,
wherein the user information comprises at least one of user identification information, location information, service information used by the user, or preferred content information,
wherein the edit screen corresponds to a graphic tool comprising a first region configuring the user screen of the external display apparatus and displaying a plurality of containers of which size or position can be adjusted, and a second region providing a service list comprising a first plurality of items selectable to be arranged in the plurality of containers, and a template list comprising a second plurality of items selectable to be arranged in the plurality of containers, the second plurality of items of the template list corresponding to basic templates provided by at least one service provider,
wherein the first plurality of items of the service list comprises at least one of a preferred channel guide item, a social network service (SNS) item or a subscription service item generated based on the user information, and
wherein, based on a first user input selecting at least one item from the first plurality of items of the service list and moving the selected item from the first plurality of items to a first container of the plurality of containers and a second user input selecting at least one item from the second plurality of items of the template list and moving the selected item from the second plurality of items to a second container of the plurality of containers being received, the processor is configured to transmit user input information associated with the first user input and the second user input to the server through the communicator so that the server updates the user screen based on the transmitted user input information and the updated user screen comprising user's favorite content and SNS content corresponding to the first user input associated with the service list and up-to-date content and popular content corresponding to the second user input associated with the template list provided by the service provider is provided from the server to the external display apparatus to be displayed on the external display apparatus.

2. The terminal apparatus according to claim 1, wherein the container is subjected to be added or deleted in the first region.

3. The terminal apparatus according to claim 1,
wherein the updated user screen is processed based on size and resolution of the display by the server.

4. The terminal apparatus according to claim 3, wherein the updated user screen is provided from the server to the external display apparatus in response to an event comprising at least one of a power-on command, home-button control during an operating state, or a user's trigger voice utterance occurred in the external display apparatus.

5. A method of controlling a terminal apparatus communicating with a server, the method comprising:
based on a user input to enter a user screen edit mode for editing a user screen of an external display apparatus which is associated with a user being received, transmitting information indicating entrance to the user screen edit mode and user information of the user to the server;
receiving edit screen information generated based on the user information of the user and used for setting the user screen of the external display apparatus from the server;
displaying an edit screen based on the received edit screen information; and
transmitting information to update the user screen according to the user input received with regard to the displayed edit screen to the server,
wherein the user information comprises at least one of user identification information, location information, service information used by the user, or preferred content information,
wherein the edit screen corresponds to a graphic tool comprising a first region configuring the user screen of the external display apparatus and displaying a plurality of containers of which size or position can be adjusted, and a second region providing a service list comprising a first plurality of items selectable to be arranged in the plurality of containers, and a template list comprising a second plurality of items selectable to be arranged in the plurality of containers, the second plurality of items of the template list corresponding to basic templates provided by at least one service provider,
wherein the first plurality of items of the service list comprises at least one of a preferred channel guide item, a social network service (SNS) item or a subscription service item generated based on the user information, and
wherein, based on a first user input selecting at least one item from the first plurality of items of the service list and moving the selected item from the first plurality of items to a first container of the plurality of containers and a second user input selecting at least one item from the second plurality of items of the template list and moving the selected item from the second plurality of items to a second container of the plurality of containers being received, the transmitting the information comprises transmitting user input information associated with the first user input and the second user input to the server so that the server updates the user screen based on the transmitted user input information and the updated user screen comprising user's favorite content and SNS content corresponding to the first user input associated with the service list and up-to-date content and popular content corresponding to the second user input associated with the template list provided by the service provider is provided from the server to the external display apparatus to be displayed on the external display apparatus.

6. The method according to claim 5, wherein the container is subjected to be added or deleted in the first region.

* * * * *